United States Patent [19]

Minnick

[11] 4,085,439
[45] Apr. 18, 1978

[54] COMPUTER PROGRAMMING SYSTEM HAVING GREATLY REDUCED STORAGE CAPACITY AND HIGH SPEED

[75] Inventor: William A. Minnick, Cupertino, Calif.

[73] Assignee: Itek Corporation, Lexington, Va.

[21] Appl. No.: 718,299

[22] Filed: Aug. 27, 1976

[51] Int. Cl.² .............................................. G06F 9/00
[52] U.S. Cl. ................................................... 364/200
[58] Field of Search .............................. 364/200 MS

[56] References Cited

U.S. PATENT DOCUMENTS

| | | | |
|---|---|---|---|
| 3,800,293 | 3/1974 | Enger et al. | 340/172.5 |
| 3,859,636 | 1/1975 | Cook | 340/172.5 |
| 3,953,833 | 4/1976 | Shapiro | 340/172.5 |

*Primary Examiner*—Raulfe B. Zache
*Attorney, Agent, or Firm*—Homer O. Blair; Robert L. Nathans; Gerald H. Glanzman

[57] ABSTRACT

A main programming memory device is coupled to an arithmetic logic unit through controllable gating circuitry which permits the majority of control data within the main memory to be sequentially transmitted to the arithmetic logic unit for control of arithmetic data therein. An instruction designation source controls a main memory address device which in turn is coupled to the main programming memory to initiate data readout to the arithmetic logic unit, through the gating circuitry, such instruction designation source also being coupled to a function memory which contains arithmetic logic data unique to particular instructions to be executed. Data source selection bits are associated with arithmetic logic data stored within the main programming memory and control the gating circuitry to cause arithmetic logic data to be transmitted from the main programming memory to the arithmetic logic unit when the source selection bits have a first value, and which cause the unique instruction data within the addressed function memory to be transmitted to the arithmetic logic unit, rather than data from the main programming memory, when the source selection bits have a second value.

12 Claims, 4 Drawing Figures

4,085,439

COMPUTER PROGRAMMING SYSTEM HAVING GREATLY REDUCED STORAGE CAPACITY AND HIGH SPEED

BACKGROUND OF THE INVENTION

The present invention relates to programming means for sequentially producing groups of data to be transmitted to an arithmetic logic unit to cause such unit to execute selected instructions upon arithmetic data processed therein.

In prior art systems, a relatively large main programming memory contains blocks of data, each block being associated with a particular instruction to be executed by the arithmetic logic unit. An address memory addresses a selected block of data within the programming memory and causes such selected block of data to be sequentially transmitted to the arithmetic logic unit. Since major portions of the data in each different instruction block are the same with respect to corresponding data in the other blocks, and since only minor portions of the data within each block are unique to particular instructions to be executed, this prior art approach is extremely wasteful of storage capacity of the main programming memory. One approach with respect to reducing such storage capacity is to employ subroutining techniques known in the art. Such techniques, however, rule out a common first control memory subcell so that on balance this approach does not minimize main control memory requirements.

It has thus been desirable to reduce the main programming memory requirements and yet maintain a high speed single level microprogramming address mapping system. The approach in the present invention is based upon the fact that a class of computer instructions such as add, subtract, exclusive OR, AND, and the like are implemented in controlled sequences which only differ in limited respects in accordance with the particular instruction being executed. In other words, major portions of the data within each block do not differ from corresponding data in other blocks, so that a great deal of redundancy, which results in waste of storage capacity exists. In accordance with the present invention, such storage capacity is drastically reduced, and at the same time the speed of operation is not sacrificed and is substantially the same as the operating speed of the prior art approach which employs a large main microprogramming memory. There has been a long felt need in the countermeasures field to drastically reduce the requisite storage capacity of the microprogramming memory and thus the total memory requirements of the system, to minimize memory device volume, while at the same time maintaining extremely high operating speeds.

SUMMARY OF A PREFERRED EMBODIMENT OF THE INVENTION

In accordance with a preferred embodiment of the invention, an arithmetic auxiliary logic function memory contains data unique to the particular instruction being executed, which data is transmitted to the arithmetic logic unit by controllable gating circuitry when data source selection bits added to the main programming memory and having a particular value, command the gating circuitry to do so. In contrast, the vast majority of the control data, non-unique and common to all instructions being executed, is sequentialy readout of the main programming memory through the gating circuitry at all other times during the readout period. Thus, only data unique to a particular instruction is transmitted to the arithmetic logic unit in place of the unique data which was previously stored within, and readout of, the main programming memory in accordance with the prior art, and thus redundancy of non-unique data in numerous blocks of data within the programming memory is eliminated.

Other objects, features and advantages of the present invention will become apparent upon study of the following detailed description taken in conjunction with the drawings in which:

FIGS. 1 and 2 schematically illustrate the prior art approach; and

FIG. 3 taken in conjunction with FIG. 4 schematically illustrates a preferred embodiment of the invention.

DETAILED DESCRIPTION

Figure 1:
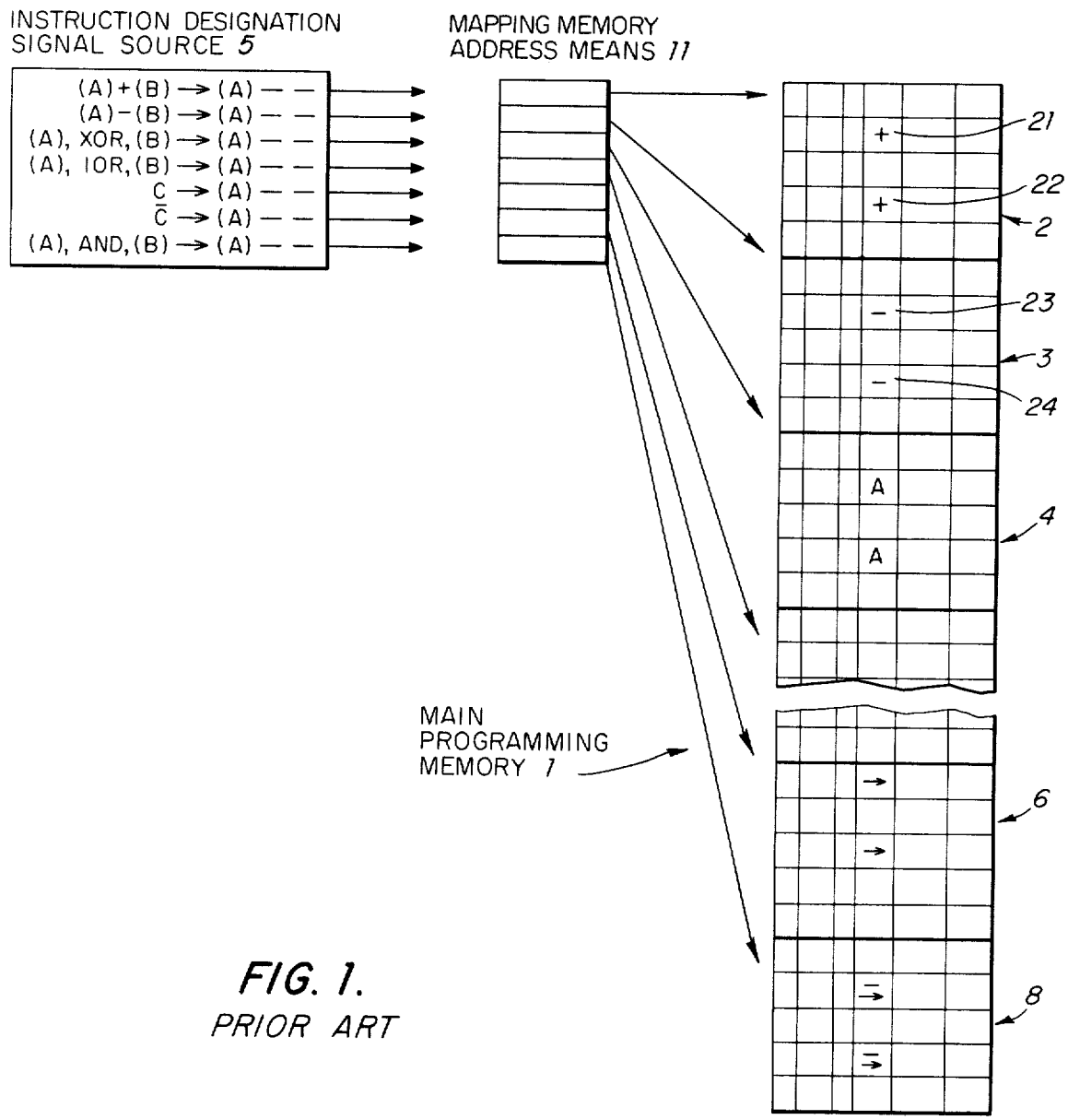
Figure 2:
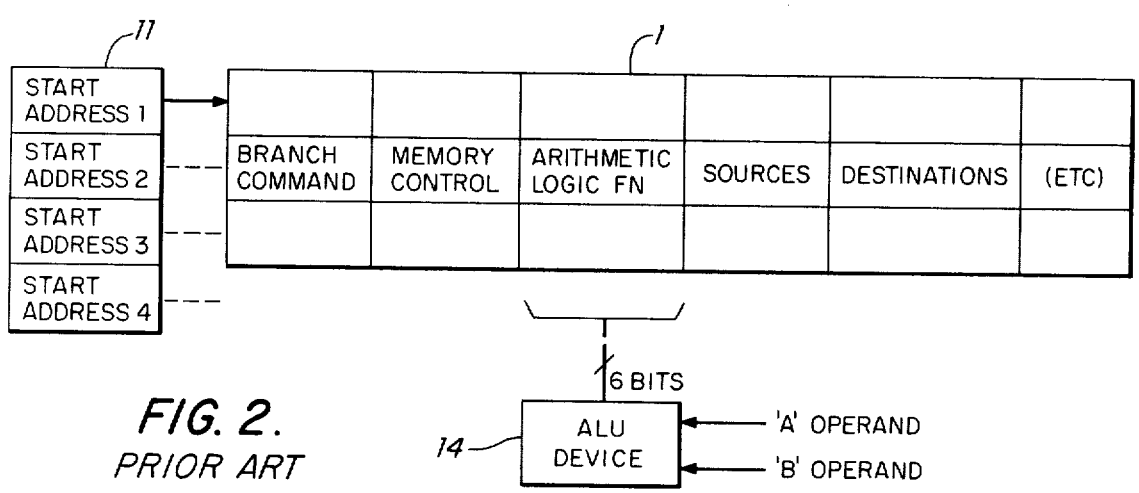

As illustrated in FIG. 1, main or programming memory 1 is illustrated having a plurality of blocks of cells, 2, 3, 4, 6 and 8 being shown. Each cell block comprises five rows of binary bits, each row containing 40 bits of sequencing command data. Sequencing address memory 11 contains seven blocks of cells therein, as illustrated in FIG. 1, each cell block being associated with a separate register instruction. Instructions as shown are a particular sub-family of instructions well known to those skilled in the art, which relate to typical arithmetic-logical operations such as addition, subtraction, exclusive AND, inclusive OR operations, register loading, etc. The main program memory 1 and the mapping address memory 11 preferably consists of programmable read-only memory devices known to those skilled in the art as PROMS. In accordance with the prior art system illustrated in FIG. 1, a particular instruction from instructon source 5 causes mapping address memory 11 to select a particular block of data from a selected cell block 2, 3, 4, etc. of microgram memory 1, which data is sequentially readout on a row by row basis to an arithmetic logic unit or ALU device, which device is also coupled to a source of variable arithmetic data. Such a prior art ALU device is illustrated in FIG. 2 and is labeled 14. The device processes arithmetic data such as an A-operand and a B-operand and receives its command signals from the main control memory 1 in sequential fashion as is well understood in the art, so as to manipulate the arithmetic data in the computer, not shown, which also forms no part of the present invention. For example, let it be assumed that the first instruction in FIG. 1 is to be executed by the computer, or arithmetic unit, (ALU); that is the contents of an A register is to be added to the contents of a B register and the sum is to be transferred back into the A register in the ALU. Address means 11 would function to select the first block of memory cells 2 as shown in FIG. 1, and the 40 bit word in the first row of block 2 is readout in parallel to a buffer register, not shown, which in turn causes the computer to execute the first step of the five steps which effect the add instruction. After the first row of data causes the first step in the instruction to be executed by the computer, the second row of data is thereafter readout into the buffer store in the well known manner to cause the computer to execute the second step of the instruction, etc. until the last step which, in the example, causes the 40 bit word in the fifth row of data to be readout into the buffer store.

In the case of the second listed subtraction instruction, the rows of data in the second cell block 3 of mapping address memory 11 would be sequentially readout into the buffer store to cause the data to be manipulated in the computer to produce a subtraction of B from A rather than an addition. In other words, a given instruction causes the mapping memory address means 11 to select an appropriate block of data from the programming memory 1 which in turn causes the rows of binary data to be sequentially readout from the selected cell block, thereby to cause the computer to execute the desired instruction as is also well understood by those skilled in the art.

A minor portion of the cells of the blocks of cells are unique to the particular instruction being executed; for example, in block 2 of memory 1, cells 21 and 22 contain bits of data which are unique to the addition instruction; in like manner cells 23 and 24 contain groups of binary bits in which are unique to the subtraction instructon and differ from the data in cells 21 and 22, which are required to effect the addition instruction. However, major portions of groups of data within each block of cells are common to corresponding data in other blocks which are associated with other instructions to be executed, as well understood by those skilled in the art. For example, the transfer of data from one register to another is a function which is common with a number of instructions so that rows 1, 6 and 11 within blocks 2, 3, and 4 of microprogram sequence memory 1 contain the same data, while the above mentioned cells 21, 22, 23 and 24 contain data which differs from associated cells in other blocks.

As mentioned above, it is highly desirable to sharply reduce the number of PROMS which are employed while maximizing processing speed, thereby to save cost, space and required performance, so that it is in turn desirable to provide a system which sharply reduces the total required storage capacity of the microprogram sequence memory 1.

Figure 3:
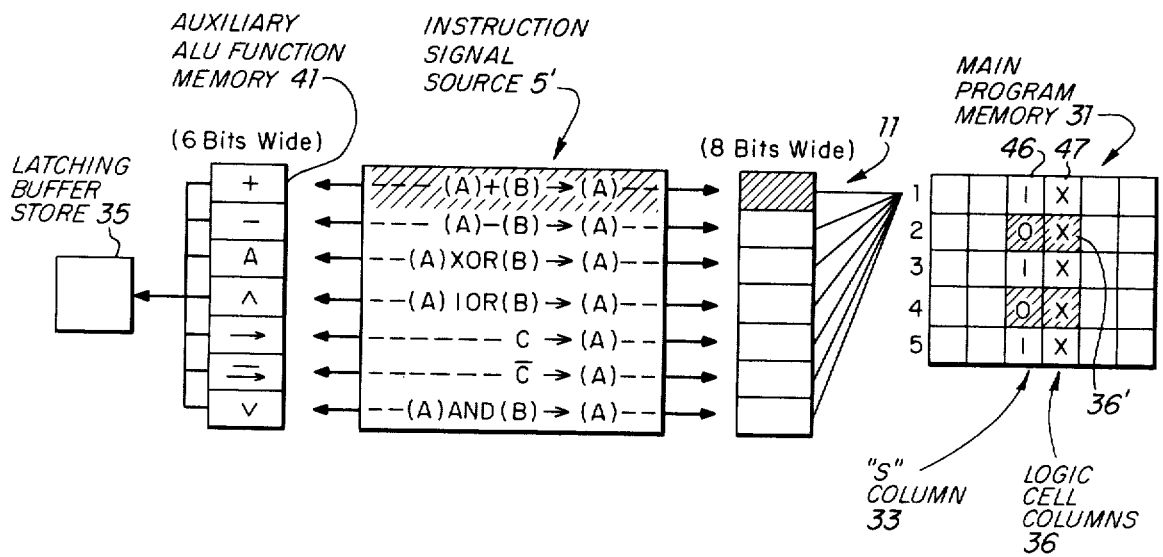

In accordance with the present invention, the main microprogram sequence memory is greatly reduced in data storage capacity although it will be able to carry out the equivalent functions previously set forth. Memory 31 shown in FIG. 3 is a similar PROM which comprises one cell block of the abovedescribed microprogram memory 1. It has five rows of binary bits, each row being 41 rather than 40 bits wide. The additional bit is contained within a column of source selection S-cells 33 illustrated in FIG. 3. Directly adjacent to the source cell column is a column of arithmetic logic or "logic cell" control bits which are represented as X cell columns 36 (6 bits wide) in FIG. 3. The shaded source selection S-cells and the shaded X-logic cells together represent a block of data in the second and fourth row of memory 1, shown in FIG. 1, which is unique to a particular instruction. In accordance with the invention, an auxiliary ALU function memory 41 is added. This memory comprises 7 rows of cells, each of which contain 6 bits of fixed data which is unique to a particular arithmetic logic function to be executed, in contrast with other data which is common to a number of instructions.

Figure 4:
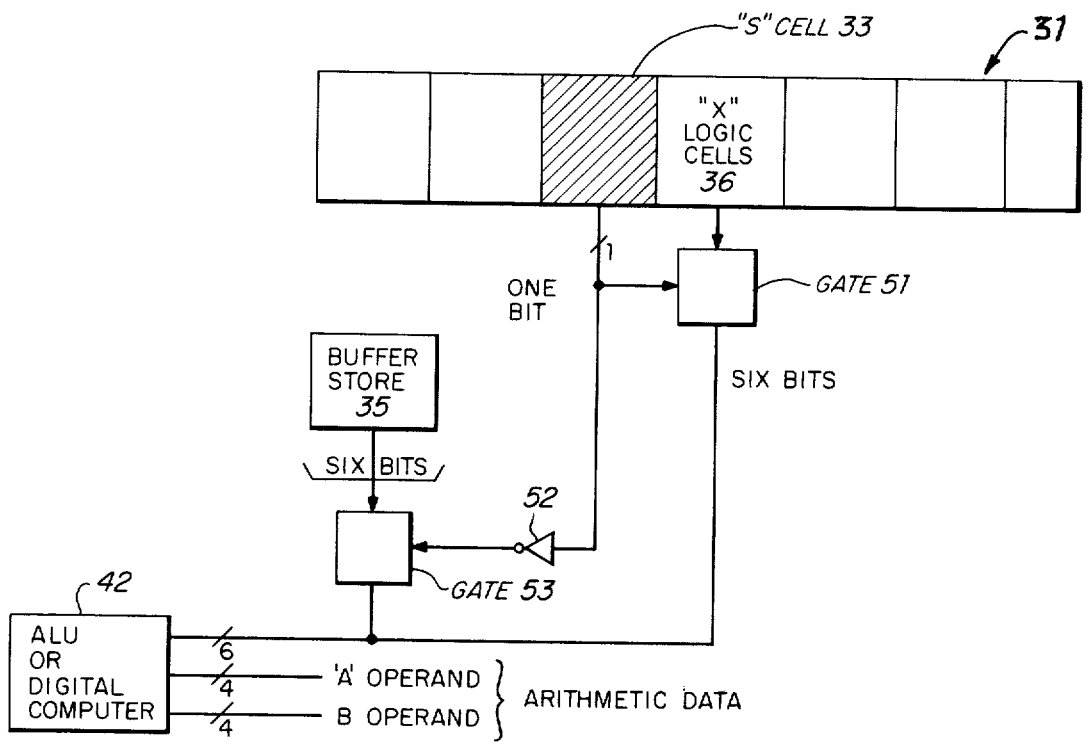

Let it now be assumed that the add instruction is to be executed. The data in the first row of main memory 31 is readout in parallel into the buffer store (not shown) as before, to perform the first step in the computer operation required to perform addition. The above-mentioned S-cells are present in each row of data and they are illustrated as being shaded in FIG. 3 only in rows 2 and 4. The S-cell 46 in the first row contains a binary 1 which permits the arithmetic logic data comprising a 6 bit word in the adjacent X cell 47 to be readout as in the prior art system described in FIG. 1. However, in the second row of data, the S-cell contains the binary 0 rather than a binary 1, so that readout circuitry, described below, is instructed to ignore the contents of X-cell 36' adjacent thereto, and instead causes the ALU device 42 of FIG. 4 to receive the corresponding 6 bit word in the ALU function memory latching buffer store 35 which, in turn, contains data unique to the instruction being processed. Thus, in the case of addition, the 6 bit word in the uppermost block of function memory 41 would be substituted for the 6 bit word which would otherwise be readout of cell 21 (FIG. 1) of the main microprogram memory 1 in accordance with the prior art. Latching buffer store 35, coupled to ALU function memory 41, receives data from 1 of the 7 data cells addressed by the instruction signal source 5' in preparation of readout into ALU device 42 of FIG. 4. Main memory 31 having a column of S-cells 33 and X-logic cells 36 is also schematically illustrated in FIG. 4 coupled to ALU device 42 via 6 bit gate 51. PROM main memory 31 is sequentially readout on a row by row basis as previously described in connection with FIG. 3. The binary 1 in the uppermost S-cell of the first row enables gating means 51, which causes the PROM to be readout so that the 6 bit word in the uppermost X-logic cell is passed through gate 51 and into ALU device 42. Since a binary 1 is applied to inverter 52, due to its presence in the S-cell of the first row, gate 53 is disenabled so that the 6 bit word in buffer store 35 is not transmitted to ALU device 42. When the second row of the PROM is readout in parallel in the conventional manner, a binary 0 will be detected in the S-cell of the second row which will disenable gate 51 so that the contents of the X-logic cell of the second row will not pass through gate 51 to the ALU device. However, the presence of a binary 0 at the input terminal of inverter 52 will cause a binary 1 to be applied to the enabling terminal of gate 53, so that the data in buffer store 35 will pass through gate 53 to be inserted into ALU deivce 42.

It should now be understood that the provision of gating circuitry in conjunction with main memory 31, enables the ALU deivce to selectively receive data either from the X-logic cells of main memory 31 in rows where such data is not unique to the instruction to be executed, or from the buffer store 35 which contains a function word which is unique to the instruction being executed.

It cannot be overemphasized that the novel programming control system of the present invention drastically reduces the size of the prior art main microprogram memory, while at the same time does not sacrifice processing time since the operation of the above-described gating arrangement is extremely rapid. A conventional approach to drastically reducing storage capacity is to employ subroutining techniques well understood by those skilled in the art. These techniques, however, do not reduce the capacities of the required storage devices to the degree achieved by the present invention. For example, simple subroutining could eliminate the need for rows 4 and 5 in each block but the first but would duplicate rows 1, 2, and 3 for each block, and require some additional memory control field and hardware.

In the above-described example, the program memory 1 of the prior art system required 1400 bits (35 rows × 40 rows per bit). In the embodiment built by the assignee of the present invention 30 of these rows or 1200 bits are eliminated and only 42 bits with respect to the function memory cells, 6 bits with respect to the buffer store 35 and 1 bit in 5 of the remaining rows of memory 31, are added which results in a net reduction of 1147 bits.

On the other hand, the number of storage cells would only be slightly reduced employing well known subroutining approaches As an example, a subroutining approach could require the programming main control memory to be 45 bits wide to provide additional storage subtraction address data. The first block would have a 225 bit capacity whereas the remaining 6 blocks would have an 810 bit capacity so that a bit storage of 1035 bits would be required compared to 1400 bits through the use of the FIG. 1 approach, for a net reduction of only 365 bits.

While preferred embodiments of the invention have been described, the teachings of this invention will readily suggest many other embodiments to those skilled in the art.

What is claimed is:

1. A programming system for programming a computer means comprising:
   a. switching means;
   b. a main programming memory device for containing groups of data which are readout therefrom and applied to said computer means by said switching means for causing said computer means to execute a selected instruction with respect to arithmetic data processed therein;
   c. auxiliary function means for generating logic data unique to a particular instruction being executed;
   d. an instruction designation signal source for designating a particular instruction to be applied to said computer means;
   e. coupling means coupled between said instruction designation signal source and said auxiliary function means for controlling the generation of said unique logic data by said auxiliary function means in accordance with the designation of a selected instruction by said signal source;
   f. data source selection means, associated with logic data cells within said main programming memory, for producing a first signal upon readout when logic data within associated logic data cells is not unique to a particular instruction being executed and for producing a second signal upon readout when logic data within associated logic data cells is unique to a particular instruction being executed; and
   g. switch control means, coupled to said switching means, for causing logic data within said main programming memory to be transmitted by said switching means to said computer means when said data source selection means produces said first signal upon readout, and for causing said logic data generated by said auxiliary function means to be transmitted to said computer means by said switching means rather than data from said main programming memory, when said source selection means produces said second signal upon readout.

2. The combination as set forth in claim 1 wherein said data source selection means comprises a cell within said main programming memory having data therein for selectively producing said first or said second signal upon readout.

3. The combination as set forth in claim 2 wherein said main programming memory comrpises a PROM device.

4. The combination as set forth in claim 1 wherein said switch control means further comprises a first gate for transmitting data from said main programming memory to said computer means, a second gate for transmitting data from said auxiliary function means to said computer means and inverter means for disabling one of said gates upon the enabling of the other of said gates.

5. The combination as set forth in claim 2 wherein said switch control means further comprises a first gate for transmitting data from said main programming memory to said computer means, a second gate for transmitting data from said auxiliary function means to said computer means and inverter means for disabling one of said gates upon the enabling of the other of said gates.

6. The combination as set forth in claim 3 wherein said switch control means further comprises a first gate for transmitting data from said main programming memory to said computer means, a second gate for transmitting data from said auxiliary function means to said computer means and inverter means for disabling one of said gates upon the enabling of the other of said gates.

7. A programming system for programming a computer means comprising:
   a. switching means;
   b. a main programming memory device for containing groups of data which are sequentially readout therefrom and applied to said computer means by said switching means for causing said computer means to execute a selected instruction with respect to arithmetic data processed therein;
   c. an auxiliary function memory having a plurality of cells therein, each of which contains logic data unique to a particular instruction being executed;
   d. an instruction designation signal source for designating a particular instruction to be applied to said computer means;
   e. coupling means coupled between said instruction designation signal source and said auxiliary functon memory for addressing a particular cell within said auxiliary function memory corresponding to the particular instruction designated by said instruction designation signal source;
   f. data source selection cells associated with logic data cells within said main programming memory, for producing a first signal upon readout when logic data within associated logic data cells is not unique to a particular instruction being executed, and for producing a second signal upon readout when logic data within associated logic data cells is unique to a particular instruction being executed; and
   g. switch control means, coupled to said switching means, for causing logic data within said main programming memory to be transmitted by said switching means to said computer means when the data within said source selection cells, associated with logic cells containing non-unique logic data, produce said first signal upon readout, and for causing the unique logic data within the addressed cell of said auxiliary function memory to be transmitted to said computer means by said switching means rather than data from said main programming memory, when the source selection cells contain data for producing said second signal upon readout.

8. The combination as set forth in claim 7 wherein said data source selection means comprises a single cell within said main programming memory having a single bit therein for selectively producing said first or said second signal upon readout.

9. The combination as set forth in claim 8 wherein said main programming memory comrpises a PROM device.

10. The combination as set forth in claim 7 wherein said switch control means further comrprises a first gate for transmitting data from said main programming memory to said computer means, a second gate for transmitting data from said auxiliary function means to said computer means and inverter means for disabiling one of said gates upon the enabling of the other of said gates.

11. The combination as set forth in claim 8 wherein said switch control means further comprises a first gate for transmitting data from said main programming memory to said computer means, a second gate for transmitting data from said auxiliary function means to said computer means and inverter means for disabling one of said gates upon the enabling of the other of said gates.

12. The combination as set forth in claim 9 wherein said switch control means further comprises a first gate for transmitting data from said main programming memory to said computer means, a second gate for transmitting data from said auxiliary function means to said computer means and inverter means for disabling one of said gates upon the enabling of the other of said gates.

* * * * *